(12) United States Patent
Zhong et al.

(10) Patent No.: US 12,447,561 B2
(45) Date of Patent: Oct. 21, 2025

(54) COPPER-PHOSPHORUS BRAZING FOIL AND PREPARATION METHOD THEREOF

(71) Applicant: ZHENGZHOU RESEARCH INSTITUTE OF MECHANICAL ENGINEERING CO., LTD., Henan (CN)

(72) Inventors: Sujuan Zhong, Henan (CN); Xian Dong, Henan (CN); Yinyin Pei, Henan (CN); Yafang Cheng, Henan (CN); Junlan Huang, Henan (CN); Hangyan Xue, Henan (CN); Mengjie Nie, Henan (CN); Wenbin Li, Henan (CN)

(73) Assignee: ZHENGZHOU RESEARCH INSTITUTE OF MECHANICAL ENGINEERING CO., LTD., Henan (CN)

( * ) Notice: Subject to any disclaimer, the term of this patent is extended or adjusted under 35 U.S.C. 154(b) by 358 days.

(21) Appl. No.: 18/169,194

(22) Filed: Feb. 14, 2023

(65) Prior Publication Data

US 2023/0405733 A1    Dec. 21, 2023

(30) Foreign Application Priority Data

Jun. 15, 2022   (CN) .......................... 202210676978.4

(51) Int. Cl.
  *B23K 35/02*   (2006.01)
  *B23K 35/30*   (2006.01)
  *B23K 35/40*   (2006.01)
(52) U.S. Cl.
  CPC ........ *B23K 35/0238* (2013.01); *B23K 35/302* (2013.01); *B23K 35/40* (2013.01)
(58) Field of Classification Search
  CPC .................................................. B23K 35/0238
  See application file for complete search history.

(56) References Cited

U.S. PATENT DOCUMENTS 4,786,375 A * 11/1988 Graydon ................... C25C 1/12
                                                  205/228
2006/0163322 A1   7/2006 Mochizuki et al.
(Continued)

FOREIGN PATENT DOCUMENTS

CN      101475395 A    7/2009
CN      101528408 A    9/2009
(Continued)

OTHER PUBLICATIONS

Machien translation of JP2013018041 A (Japanese document published 2013).*

(Continued)

*Primary Examiner* — Christopher S Kessler
(74) *Attorney, Agent, or Firm* — Tarolli, Sundheim, Covell &Tummino LLP

(57) ABSTRACT

The present disclosure provides a copper-phosphorus brazing foil and a preparation method thereof, which relates to the technical field of brazing material. It comprises a copper inner core and a copper-phosphorus alloy layer coating outside the copper inner core, wherein the phosphorus content in the copper-phosphorus brazing foil is over 5 wt %, and the thickness of the copper-phosphorus brazing foil is below 0.5 mm. In the present disclosure, red copper foil is used as the core layer, and the surface of the red copper foil is alloyed with a layer of copper-phosphorus alloy by the eutectic reaction between the core layer and red phosphorus, such that the copper-phosphorus brazing foil is obtained. The present disclosure prepares a copper-phosphorus brazing foil with high phosphorus content and lower thickness. Comparing with the traditional preparation method, the preparation method of the present disclosure has high efficiency and high yield.

4 Claims, 1 Drawing Sheet

(56) References Cited

U.S. PATENT DOCUMENTS

2009/0324984 A1* 12/2009 Mochizuki ......... B23K 35/0238
　　　　　　　　　　　　　　　　　　　　　　　419/68
2016/0175990 A1* 6/2016 Sjödin ................ B23K 35/0244
　　　　　　　　　　　　　　　　　　　　　　　524/414
2018/0029168 A1* 2/2018 Schoonover .......... B23K 11/115

FOREIGN PATENT DOCUMENTS

| CN | 108598451 A | | 9/2018 |
| CN | 111020443 A | | 4/2020 |
| CN | 214300303 U | | 9/2021 |
| JP | S58159999 A | | 9/1983 |
| JP | H10193168 A | | 7/1998 |
| JP | 2013018041 A | * | 1/2013 |

OTHER PUBLICATIONS

CNOA: First Office Action issued Feb. 27, 2023 for corresponding CN 202210676978.4 ~ English translation.

SearchReportPriority: First Search Report for priority application No. CN2022106769784.

Fall, et al.: "Development and Application of High-Phosphorus Copper Brazing Filler Metal"; Lake Metallurgy, No. 4, pp. 16-19, Jul. 1992.

* cited by examiner

COPPER-PHOSPHORUS BRAZING FOIL AND PREPARATION METHOD THEREOF

CROSS-REFERENCE TO RELATED APPLICATION

The present disclosure claims priority of Chinese patent application with the filing number 202210676978.4 filed on Jun. 15, 2022 with the Chinese Patent Office, and entitled "Copper-phosphorus Brazing Foil and Preparation Method Thereof", the contents of which are incorporated herein by reference in entirety.

TECHNICAL FIELD

The present disclosure relates to the technical field of brazing materials, in particular to a copper-phosphorus brazing foil and a preparation method thereof.

BACKGROUND ART

Brazing is widely used (such as the application of shield machine cutter disclosed in the document CN110468406A, and the application of the flux-cored silver brazing filler metal for brazing stainless steel disclosed in the document CN111344105A). Brazing filler metal refers to the filler added in or beside the gap in order to realize the combination of two materials (or parts). Brazing filler metal refers to the filler material used to form the brazing seam during brazing. Copper-phosphorus brazing filler metal has been widely used in brazing copper and copper alloys due to its advantages, such as good process performance and low price.

Phosphorus in copper-phosphorus brazing filler metal has two functions: one is to significantly reduce the melting point of copper; the other is to act as self-fluxing when brazing copper in the air. However, with the increase of phosphorus content in copper-phosphorus brazing filler metal, the content of brittle phase $Cu_3P$ in copper-phosphorus brazing filler metal increases, resulting in poor plasticity of the brazing filler metal and difficult processing. Especially, when the phosphorus content in the brazing filler metal is increased to more than 7.5%, it is impossible to obtain a thin copper-phosphorus brazing foil (with a thickness less than 0.5 mm) by using the existing preparation process.

In addition, the existing preparation process of copper-phosphorus brazing foil is hot rolling, which not only consumes processing energy during processing, but also often has edge cracking or brittle rupture in the rolling process due to poor plasticity of the brazing filler metal when processing the copper-phosphorus brazing foil having the phosphorus content more than 5%, resulting in low processing efficiency, low yield and other problems.

In order to solve the above deficiencies, it is necessary to develop a new type of copper-phosphorus brazing foil and a preparation method thereof.

SUMMARY

The purpose of the present disclosure is to provide a copper-phosphorus brazing foil and a preparation method thereof, so as to prepare a copper-phosphorus brazing foil with a relatively high phosphorus content and a thin thickness; compared with the traditional preparation method, the method has high efficiency and high yield.

The technical solution provided by the present disclosure is as follows.

In one aspect, the present disclosure provides a copper-phosphorus brazing foil, the copper-phosphorus brazing foil includes a copper inner core and a copper-phosphorus alloy layer coating outside the copper inner core, wherein the phosphorus content of the copper-phosphorus brazing foil is more than or equal to 5 wt %, and the thickness of the copper-phosphorus brazing foil is less than or equal to 0.5 mm.

In one embodiment, the phosphorus content of the copper-phosphorus brazing foil is 7 wt % or more, preferably 7-8.4 wt %.

In another aspect, the present disclosure provides the preparation method of the copper-phosphorus brazing foil, wherein the red copper foil is used as the core layer, and the surface of the red copper foil is alloyed to form a layer of copper-phosphorus alloy by eutectic reaction between the core layer and red phosphorus, so as to obtain the copper-phosphorus brazing foil.

In one embodiment, the thickness of the red copper foil is 0.1-0.5 mm.

In one embodiment, the red copper foil is pretreated, the pretreatment comprises that after the red copper foil is polished with sandpaper and wiped with alcohol, the surface is coated with a layer of copper flux.

In one embodiment, the purity of the red phosphorus is greater than or equal to 99.99%, and the red phosphorus is heated to molten red phosphorus with a temperature of 650-720° C.

Preferably, the core layer of the red copper foil is enabled to pass through the molten red phosphorus at a speed of 5-15 mm/s.

In another aspect, the present disclosure provides a device for preparing copper-phosphorus brazing foil, which is suitable for the preparation method of copper-phosphorus brazing foil, wherein the device includes a pay-off reel, airtight container (9), take-up reel and motor, wherein the airtight container (9) includes a feeding hole (2), a discharge hole (8) and an air-inlet hole (6); the airtight container is provided therein with a guide wheel 1 (3), a guide wheel 2 (4) and a guide wheel 3 (7); an induction coil (10) is provided at the bottom of the airtight container (9).

In one embodiment, the feeding hole and the discharge hole are provided with seals or sealing material for sealing the inner cavity of the container to achieve dynamic sealing of the container.

In one embodiment, the airtight container (9) is a medium-pressure container.

In one embodiment, the airtight container (9) is provided with airtight container cover plate (5).

In one embodiment, the sealing material is a graphite packing ring.

In one embodiment, the guide wheel 1, the guide wheel 2, and the guide wheel 3 are all aluminum oxide guide wheels.

In another aspect, the present disclosure provides a method for preparing copper-phosphorus brazing foil by the aforementioned device, comprising the following steps:
  (a) opening the cover plate (5) of the airtight container, and placing red phosphorus with a purity greater than or equal to 99.99% at the bottom of the airtight container;
  (b) after pretreating the red copper foil, making the red copper foil enter the feeding hole through the pay-off reel, pass through the guide wheel 1, guide wheel 2 and guide wheel 3 inside the container, and wound on the take-up reel through the discharge hole;

(c) closing the cover plate, turning on the power supply of the induction coil and heating the airtight container until the red phosphorus melts into metal liquid; and (d) turning on the motor of the take-up reel, making the red copper foil pass through the molten red phosphorus at a constant speed, and winding up to obtain the copper-phosphorus brazing foil.

Further, in step (b), the thickness of the red copper foil is 0.1-0.5 mm.

Further, in step (b), the pretreatment of the red copper foil includes coating a surface with a layer of copper flux after the red copper foil is polished with sandpaper and wiped with alcohol. In a preferred solution, the coating is brush coating or dip-coating.

Further, in step (c), a pressure is applied to the airtight container and the induction coil is electrified to heat; further, the induction coil is electrified to heat to a temperature of 650-720° C.

Further, in step (d), the red copper foil is passed through the molten red phosphorus at a speed of 5-15 mm/s.

In one embodiment, the sealing material is a graphite packing ring; and the guide wheel 1, guide wheel 2 and guide wheel 3 are all aluminum oxide guide wheels.

In the present disclosure, the container can be dynamically sealed by the sealing material to form a completely closed space; when the sealing material is not used, the container and the atmosphere are in the ordinary exchanging status; when the sealing material is used, a closed structure is constructed inside the container. Closing the cover plate and filling gas into the airtight container can increase the pressure inside the container. The gas is introduced into the airtight container through the air-inlet hole. When the pressure inside airtight container reaches a certain point, the coil power supply is turned on (the coil is energized), the heating is started to a certain temperature, and the red phosphorus melts to liquid state.

In one embodiment, the cover plate of the container is opened, and an appropriate amount of red phosphorus is placed at the bottom of the airtight container; after pretreating the red copper foil, a layer of flux is applied on it. The red copper foil is drawn by the pay-off reel, enters the feeding hole of the airtight container, passes through the guide wheel 1, guide wheel 2 and guide wheel 3 in the container, and finally passes through the discharge hole of the airtight container and is wound on the take-up reel. The cover plate is closed, the gas is introduced into the airtight container, and the heating is started when the pressure reaches 4300 Kpa. When heating to a certain temperature, the red phosphorus becomes molten red phosphorus. The power supply is turned on, and the red copper foil is passed through the molten red phosphorus in the airtight container at the certain speed, and wound up to obtain copper-phosphorus brazing foil.

In a specific embodiment, the preparation method of copper-phosphorus brazing foil includes the following steps:

(1) opening the container cover plate, putting an appropriate amount of red phosphorus at the bottom of the airtight container (a purity of red phosphorus ≥99.99%);

(2) after polishing the red copper foil with sandpaper and wiping it with alcohol, coating a layer of copper flux on the surface thereof (the thickness of the red copper foil is 0.1-0.5 mm);

(3) making the red copper foil of step (2) enter the feeding hole, pass through the guide wheel 1, guide wheel 2 and guide wheel 3 inside the container, and finally wound on the take-up reel through the discharge hole;

(4) closing the cover plate, sleeving the induction coil over the bottom of the container, and setting the dynamic sealing material at the discharge hole and the feeding hole of the container;

(5) filling gas into the airtight container through the air-inlet hole, when the pressure in the airtight container reaches 4300 Kpa, energizing the coil and starting heating to a certain temperature (650-720° C.), such that the red phosphorus melts into a liquid state; and (6) turning on the motor of the take-up reel, making the red copper foil pass through the molten red phosphorus at a certain speed (5-15 mm/s), and winding up to get the copper-phosphorus brazing foil.

Firstly, the cover plate is opened, an appropriate amount of red phosphorus is put on the bottom of the airtight container, and then the pretreated red copper foil is drawn through the pay-off reel, enters the feeding hole of the airtight container, is guided by the guide wheel 1, the guide wheel 2 and the guide wheel 3 and finally passes through the discharge hole of the airtight container and is wound on the take-up reel. The cover plate is closed, the coil power supply is turned on, and the airtight container is heated to a certain temperature such that the red phosphorus melts into metal liquid. The motor of the take-up reel is turned on, and the entered red copper foil passes through the molten red phosphorus at a certain speed, and is wound up to obtain copper-phosphorus brazing foil.

Compared with the prior art, the beneficial effects of the present disclosure are as follows.

(1) In the present disclosure, the red copper foil with good plasticity is used as the core layer, and the core layer forms the copper-phosphorus alloy layer by having eutectic reaction with the molten red phosphorus, such that the copper-phosphorus brazing foil is obtained.

(2) The phosphorus content of the copper-phosphorus brazing foil of the present disclosure can reach 8.4%, forming the eutectic having the thickness below 0.5 mm.

(3) The preparation method of the present disclosure is ingenious, with high production efficiency and high yield.

BRIEF DESCRIPTION OF DRAWINGS

In order to illustrate the technical solutions in the specific embodiments of the present disclosure or the prior art more clearly, the drawings required to be used in the description of the specific embodiments or the prior art will be described briefly in the following parts. Obviously, the drawings in the following description are some embodiments of the present disclosure. For those of ordinary skill in the art, other drawings can also be obtained from these drawings without creative efforts.

DETAILED DESCRIPTION OF EMBODIMENTS

Figure 1:
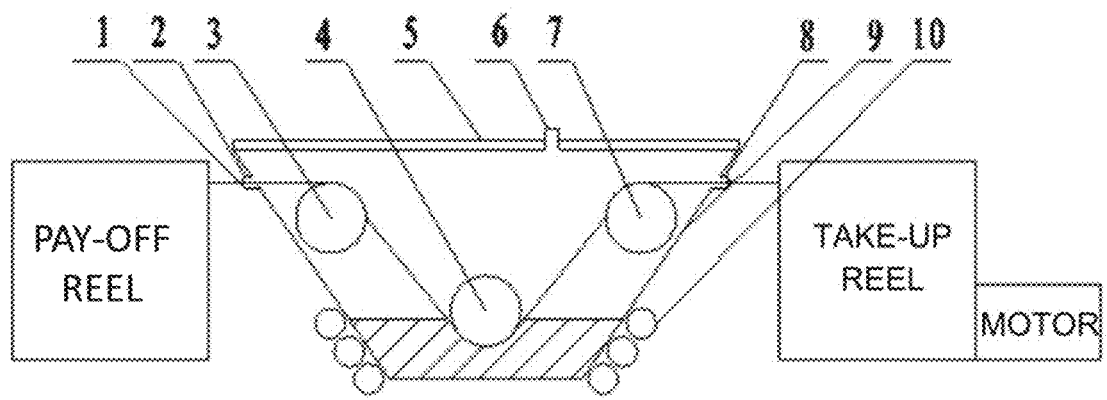
FIG. 1 is the flow chart of the preparation process provided by an embodiment of the present disclosure (1, red copper foil; 2, feeding hole; 3, guide wheel 1; 4, guide wheel 2; 5, airtight container cover plate; 6, air-inlet hole; 7, guide wheel 3; 8, discharge hole; 9, airtight container; 10, induction coil)

The technical solutions of the present disclosure will be described clearly and completely below with reference to the embodiments. Obviously, the described embodiments are part of the embodiments of the present disclosure, but not all of the embodiments. Based on the embodiments of the present disclosure, all other embodiments obtained by those of ordinary skill in the art without creative efforts shall fall within the protection scope of the present disclosure.

Example 1

A copper-phosphorus brazing foil is composed of a two-layer structure, the inner core layer is red copper, and the outer part is copper-phosphorus alloy.

The preparation method of copper-phosphorus brazing foil as mentioned above comprises the following steps:
- Step (1): opening the cover plate of the medium-pressure container, putting an appropriate amount of red phosphorus of a purity 99.99% at the bottom of the airtight container;
- Step (2): taking a red copper foil (with the thickness of 0.5 mm), after polishing the red copper foil with sandpaper and wiping it with alcohol, coating a layer of copper flux on the surface thereof;
- Step (3): making the red copper foil of step (2) enter the feeding hole, pass through the guide wheel 1, guide wheel 2 and guide wheel 3 inside the container, and finally wound on the take-up reel through the discharge hole;
- Step (4): closing the cover plate, sleeving the induction coil over the bottom of the container, and setting the dynamic sealing material at the discharge hole and the feeding hole of the container;
- Step (5): filling gas into the airtight container through the air-inlet hole, when the pressure in the airtight container reaches 4300 Kpa, energizing the coil and starting heating to 720° C., such that the red phosphorus melts into a liquid state; and
- Step (6): turning on the motor of the take-up reel, making the red copper foil pass through the molten red phosphorus at a certain speed (5 mm/s), and winding up to get the copper-phosphorus brazing foil having a phosphorus content of 8.4% and a thickness of 0.5 mm.

In the above, the guide wheel 1, guide wheel 2, and guide wheel 3 in step (3) are made of aluminum oxide.

The dynamic sealing material in step (4) is graphite packing ring.

FIG. 1 is a schematic diagram of the preparation device used in the above steps, including a pay-off reel, an airtight container, a take-up reel and a motor placed in sequence. The inside of the airtight container is provided with guide wheel 1, guide wheel 2 and guide wheel 3. The outside of airtight container is provided with air-inlet hole, and its feeding hole and discharge hole are provided with dynamic sealing materials; and the bottom of the airtight container is sleeved into the appropriate position of the induction coil.

Firstly, the cover plate of the container is opened, an appropriate amount of red phosphorus is put on the bottom of the airtight container, and then the pretreated red copper foil is pulled by the pay-off reel, enters the feeding hole of the airtight container, is guided by the guide wheel 1, guide wheel 2, and guide wheel 3, finally passes through the discharge hole of the airtight container and is wound on the take-up reel. The cover plate is closed, the coil power supply is turned on, and the airtight container is heated to a certain temperature, such that the red phosphorus melts into metal liquid. The take-up reel motor is turned on, and the entered red copper foil is passed through the molten red phosphorus at a certain speed, and wound up to obtain the copper-phosphorus brazing foil with thickness of 0.18 mm.

Example 2

The preparation method of the brazing filler metal in this example is identical to that in Example 1.

The difference is that the wire diameter of the red copper foil in step (2) is 0.4 mm; the heating temperature in step (5) is 710° C., and the certain speed in step (6) is 8 mm/s.

In this example, the thickness of the brazing foil obtained is 0.42 mm, and the content of P in the brazing foil is 8%.

Example 3

The preparation method of the brazing filler metal in this example is identical to that in Example 1.

The difference is that the wire diameter of the red copper foil in step (2) is 0.3 mm; the heating temperature in step (5) is 700° C., and the certain speed in step (6) is 10 mm/s.

Figure 2:
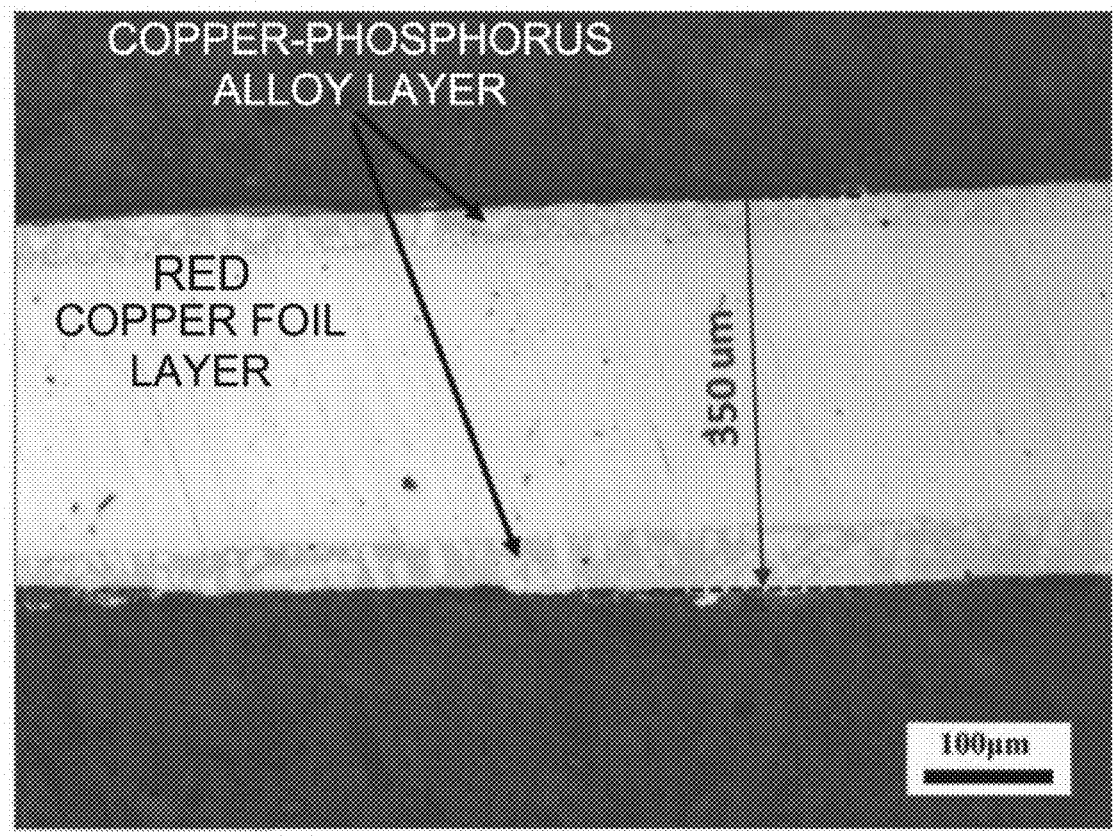
FIG. 2 shows a metallographic photograph of the section of the brazing foil of the present disclosure.

In this example, the thickness of the brazing foil obtained is 0.35 mm, and the content of P in the brazing foil is 7.8%. (FIG. 2 shows the cross-sectional metallographic structure of the brazing foil).

Example 4

The preparation method of the brazing filler metal in this example is identical to that in Example 1.

The difference is that the wire diameter of the red copper foil in step (2) is 0.2 mm; The heating temperature in step (5) is 680° C.; and the certain speed in step (6) is 12 mm/s.

In this example, the thickness of the brazing foil obtained is 0.25 mm, and the content of P in the brazing foil is 7.5%.

Example 5

The preparation method of the brazing filler metal in this example is identical to that in Example 1.

The difference is that the wire diameter of the red copper foil in step (2) is 0.1 mm; the heating temperature in step (5) is 650° C., and the certain speed in step (6) is 15 mm/s.

In this example, the thickness of the brazing foil obtained is 0.15 mm, and the content of P in the brazing foil is 7%.

Comparative Example 1

In order to investigate the efficiency and the yield of the preparation method of the present disclosure, 10 kg of BCu93P brazing filler metal with a thickness of 0.45 mm is prepared by using the hot drawing and rolling in the prior art and the method of the present disclosure, respectively.

If using the method in the prior art (hot drawing and rolling), at least 10 times of rolling (1.8, 1.6, 1.4, 1.2, 1.0, 0.8, 0.7, 0.6, 0.5, 0.45) are needed for the hot-extruded brazing strip with a thickness of 2.0 mm, each rolling takes about 10 minutes, totally 100 minutes.

By adopting the preparation method of the present disclosure, it only needs to take red copper foil with a thickness of 0.4 mm, which is wound up in the take-up reel through the guide wheels in the airtight container, which takes about 20 minutes. Therefore, the efficiency of the present disclosure is 5 times that of the existing method.

In addition, when using the existing method to prepare BCu93P brazing foil with 0.45 mm thickness, 6 kg of 0.45 mm of brazing foil can be finally obtained from 10 kg of 2.0 mm of BCu93P brazing strip. In the present disclosure, 11.5 kg of BCu93P brazing wire with a thickness of 0.45 mm can be finally obtained from 10 kg of red copper foil with a thickness of 0.4 mm, and the yield is much higher than that of the existing method.

The comparison is shown in Table 1.

TABLE 1

Comparison of the two methods

| | Yield (%) | Production Efficiency (kg/hour) |
|---|---|---|
| Existing Method | 60 | 1.6 |
| Method of the Present Disclosure | 100 | 30 |

To sum up, the existing preparation method is difficult to prepare copper-phosphorus brazing foil with the same composition and specification and having a thickness below 0.5 mm, and its yield is low. The present disclosure overcomes the limitation of the existing method, and is able to produce copper-phosphorus brazing foil with the same composition and specification and having a thickness below 0.5 mm with high yield. Taking 0.2 mm BCu93P brazing filler metal as an example, the probability of brittle rupture and edge cracking in the prior art is 100%, the brittle rupture is serious, and the yield is extremely low. However, if the present disclosure is adopted, the brittle rupture and edge cracking will not occur.

Finally, it should be noted that: the above embodiments are only used to illustrate the technical solutions of the present disclosure, but not to limit it; although the present disclosure has been described in detail with reference to the foregoing embodiments, those of ordinary skill in the art should understand that it is still possible to modify the technical solutions recorded in the forementioned embodiments, or perform equivalent replacement to some or all of the technical features therein; and these modifications or replacements do not deviate the essence of the corresponding technical solutions from the scope of the technical solutions of the embodiments of the present disclosure.

What is claimed is:

1. A method for preparing a copper-phosphorus brazing foil wherein the copper-phosporus brazing foil comprises a copper inner core and a copper-phosphorus alloy layer coating on an outside of the copper inner core, and a phosphorus content in the copper-phosphorus brazing foil is more than or equal to 5w %, and a thickness of the copper-phosphorus brazing foil is less than or equal to 0.5 mm; a red copper foil is used as a core layer, and a surface of the red copper foil is alloyed to form a layer of copper-phosphorus alloy by an eutectic reaction between the core layer and red phosphorus, so as to obtain the copper-phosphorus brazing foil.

2. The method for preparing the copper-phosphorus brazing foil according to claim 1, wherein a thickness of the red copper foil is 0.1-0.5 mm.

3. The method for preparing the copper-phosphorus brazing foil according to claim 1, wherein the red copper foil is pretreated, wherein the pretreatment comprises that after the red copper foil is polished with a sandpaper and wiped with alcohol, a surface of the red copper foil is coated with a layer of copper flux.

4. The method for preparing the copper-phosphorus brazing foil according to claim 1, wherein a purity of the red phosphorus is greater than or equal to 99.99%, and the red phosphorus is heated to molten red phosphorus with a temperature of 650-720° C.;

preferably, the core layer of the red copper foil is enabled to pass through the molten red phosphorus at a speed of 5-15 mm/s.

* * * * *